United States Patent
Fincham

(10) Patent No.: US 8,675,130 B2
(45) Date of Patent: Mar. 18, 2014

(54) ELECTRONIC ADAPTER UNIT FOR SELECTIVELY MODIFYING AUDIO OR VIDEO DATA FOR USE WITH AN OUTPUT DEVICE

(75) Inventor: Lawrence Fincham, Santa Rosa, CA (US)

(73) Assignee: THX Ltd, San Francisco, CA (US)

( * ) Notice: Subject to any disclaimer, the term of this patent is extended or adjusted under 35 U.S.C. 154(b) by 165 days.

(21) Appl. No.: 13/041,317

(22) Filed: Mar. 4, 2011

(65) Prior Publication Data

US 2012/0057078 A1 Mar. 8, 2012

Related U.S. Application Data

(60) Provisional application No. 61/310,571, filed on Mar. 4, 2010.

(51) Int. Cl.
*H04N 7/00* (2011.01)
*H04N 5/21* (2006.01)
*H04R 5/02* (2006.01)
*H04R 3/04* (2006.01)
*H04R 3/00* (2006.01)

(52) U.S. Cl.
USPC ............ 348/552; 348/606; 381/74; 381/94.2; 381/103

(58) Field of Classification Search
USPC ................ 348/552, 553, 180, 606, 607, 625; 381/56, 58, 312, 314, 72, 73.1, 74, 381/94.1, 94.2, 94.3, 334, 119, 121; 455/67.11
See application file for complete search history.

(56) References Cited

U.S. PATENT DOCUMENTS

| | | | |
|---|---|---|---|
| 4,992,966 A * | 2/1991 | Widin et al. | 702/103 |
| 5,210,803 A * | 5/1993 | Martin et al. | 381/315 |
| 5,448,646 A * | 9/1995 | Lucey et al. | 381/74 |
| 5,881,103 A * | 3/1999 | Wong et al. | 375/229 |
| 6,704,421 B1 * | 3/2004 | Kitamura | 381/103 |
| 6,859,538 B1 * | 2/2005 | Voltz | 381/77 |
| 6,999,826 B1 * | 2/2006 | Zhou et al. | 700/94 |
| 7,218,776 B2 | 5/2007 | Sowinski et al. | |
| 7,283,635 B1 * | 10/2007 | Anderson et al. | 381/74 |
| 8,250,001 B2 * | 8/2012 | Tirpak et al. | 706/11 |
| 2003/0028385 A1 * | 2/2003 | Christodoulou | 704/278 |

(Continued)

OTHER PUBLICATIONS

MP3 Players with Advanced Equalizer and Surround Sound Options. Ed. James Kim. Web., CNET reviews, Sep. 16, 2005.

(Continued)

*Primary Examiner* — Victor Kostak
(74) *Attorney, Agent, or Firm* — Irell & Manella LLP

(57) ABSTRACT

A standalone or integrated electronic unit for selectively modifying audio or video data for use with an output device. The electronic unit has one or more audio or video inputs and one or more audio or video outputs for outputting the modified audio or video source material. The unit may include sensors, selectors, and/or logic for selecting from among a plurality of modification profiles and applies the selected profile to the audio or video source material before conveying it to the output device. The modification profile may be used to adapt an audio or video source for a specific type of audio or video playback or output device. For audio, the modification profile may be used to modify audio quality by altering the transfer function, and for video, the modification profile may be used to modify video quality by altering the visual characteristics of the video source signal.

37 Claims, 8 Drawing Sheets

(56) References Cited

U.S. PATENT DOCUMENTS

| | | | |
|---|---|---|---|
| 2004/0261109 A1* | 12/2004 | Takagi | 725/74 |
| 2005/0064822 A1* | 3/2005 | Higgins et al. | 455/90.2 |
| 2007/0155332 A1* | 7/2007 | Burgan et al. | 455/67.11 |
| 2008/0020807 A1 | 1/2008 | Kolano et al. | |
| 2009/0028456 A1 | 1/2009 | Jun | |
| 2009/0083805 A1 | 3/2009 | Sizelove et al. | |
| 2010/0119093 A1* | 5/2010 | Uzuanis et al. | 381/312 |
| 2010/0161522 A1* | 6/2010 | Tirpak et al. | 706/11 |
| 2010/0220867 A1* | 9/2010 | Frerking et al. | 381/71.6 |
| 2010/0279629 A1 | 11/2010 | Srinivasan et al. | |
| 2011/0002471 A1 | 1/2011 | Wihardja et al. | |
| 2011/0166680 A1* | 7/2011 | Pander | 700/94 |
| 2012/0063615 A1* | 3/2012 | Crockett et al. | 381/98 |

OTHER PUBLICATIONS

Rockbox.org, The Rockbox Manual for Iriver H10 20 GB, (Excerpts) pp. 1-73; 126-127; 164-168; and Appendices A-C.

Published PCT Application No. WO 2011/109790, published Sep. 9, 2011 with International search report.

Written Opinion of the International Searching Authority for PCT Application No. PCT/US2011/027318, dated Apr. 27, 2011.

* cited by examiner

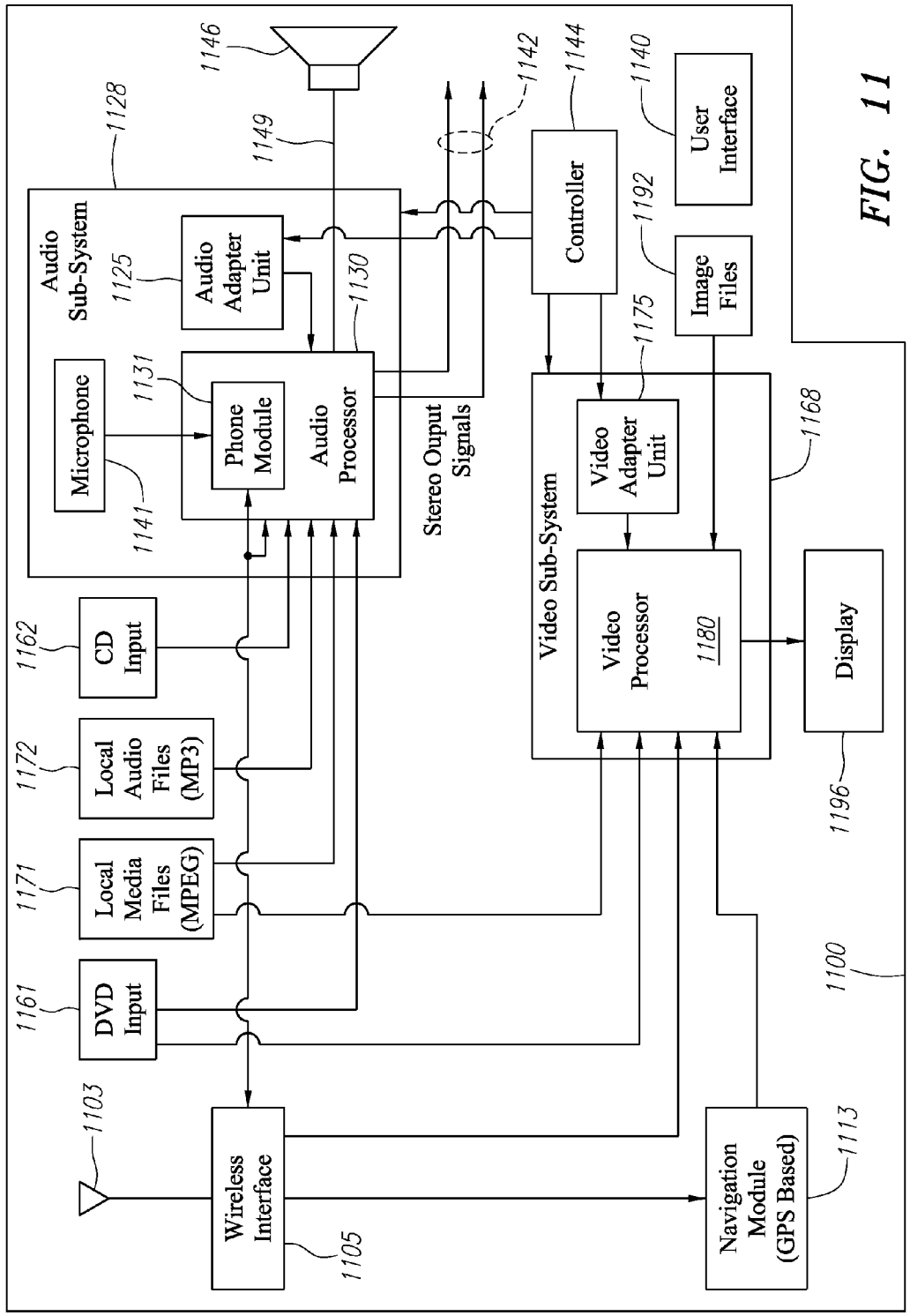

ELECTRONIC ADAPTER UNIT FOR SELECTIVELY MODIFYING AUDIO OR VIDEO DATA FOR USE WITH AN OUTPUT DEVICE

RELATED APPLICATION INFORMATION

This application claims the benefit of U.S. Provisional Application Ser. No. 61/310,571, filed on Mar. 4, 2010, hereby incorporated by reference as if set forth fully herein.

BACKGROUND OF THE INVENTION

1. Field of the Invention

The field of the invention relates to electronic processing for audio or video signals that are output by an output device, such as audio speakers and/or a video display.

2. Background of the Related Art

Recorded audio or video source material may be played back from a source device (such as a compact disc player, stereo, DVD player, computer, television, laptop, MP3 player, cassette player, radio, etc.) reading data from an audio or video source (such as a compact disc, DVD, CD-ROM, flash memory, random access memory (RAM), tape, cassette, AM/FM or satellite radio signals, etc.), and output to an audio or video output device (such as stereo speakers, earphones, computer monitor/display, analog television screen, LCD screen, plasma screen, etc.).

Typically, the listener (in the case of audio) or viewer (in the case of video) has few options in terms of optimizing or improving the sound or image quality in order to enhance the user's experience. For playing an audio source, for instance, the user may adjust bass and treble settings. This has the effect of boosting bass or treble tones, respectively. For playing back a video source, the user may be able to adjust contrast, brightness, or hue, for example. Bass/treble tone controls and video output controls are often built into the source device (such as the radio or stereo unit) or the output device (such as the LCD screen or computer monitor).

One example of a mechanism for modifying audio source material is an equalization or EQ filter (also known as an equalizer), which may be either integrated with the source device or else provided as a separate stand-alone unit. An equalization filter allows the user to manually adjust certain parameters, typically frequency response characteristics, which determine the overall shape of the filter's transfer function. Such a filter is generally used to improve sound fidelity by, e.g., providing more uniform frequency response, to emphasize certain instruments or boost certain frequencies (such as bass tones), to remove undesired noise (such as hiss), or to create new or different sounds. Equalizers may be designed with various analog or digital filters. Equalizer filters include sub-types such as parametric equalizers, graphic equalizers, and notch filters.

While equalizers provide some control over audio selection, they are complicated and inconvenient for many casual listeners. Also, they may require expensive and complex internal filters, and often require significant space and numerous control inputs (e.g., knobs or levers).

Some audio handheld devices, such as certain types of conventional MP3 players, have more advanced user selectable equalization settings tailored for specific types of music. For example, such a device may have different user-selectable equalization settings that are preset for classical music, pop music, hip-hop music, and so on. While this provides some simplification for the user, the user is still generally limited to the options that are provided by the specific device.

Similar limitations or restrictions as those described above generally exist, at least to some extent, with reproduction of live audio or video source material. That is, there are limited options that are available for modifying or improving live audio or video that is captured by an audio or video capture device and sent to an audio or video output device.

It would be advantageous to provide a means for selectively modifying audio or video data for use with an output device, to improve the perceived sound or visual quality of the audio or video source material. It would further be advantageous to provide a means to tailor an audio or video source to a particular type of audio or video output device.

SUMMARY OF THE INVENTION

In one aspect, the invention relates to an electronic unit for selectively modifying audio or video data for use with an output device. The modification of the audio or video signal may improve the perceived sound or visual quality of the audio or video source material, and/or allow the source material to be tailored to a particular type of audio or video output device.

In various embodiments, the electronic unit comprises a portable housing with one or more audio or video inputs and one or more audio or video outputs for outputting the modified audio or video source material. The electronic unit may further comprise one or more sensors or selectors, along with appropriate electronic processing and/or logic as necessary, for selecting from among a plurality of modification profiles and applying the selected profile to the audio or video source material before passing it along to the output device. For audio, the modification profile may be used to improve or modify audio quality, for example, by altering the transfer function non-uniformly over various frequency ranges. For video, the modification profile may be used to improve or modify video quality, for example, by altering the contrast, hue, tone, saturation, or other visual characteristics of the video source signal in a non-uniform or complex manner. The modification profile may be used to adapt an audio or video source for a specific type of audio or video playback or output device. The modification profile may similarly be used to improve the audio or video source material when reproduced by a particular combination of audio or video playback device and audio or video output device.

In one or more embodiments, the electronic unit may automatically detect a particular type or brand of input device, and may also automatically detect a particular brand or type of output device. Selection logic in the electronic adapter unit may select a stored modification profile based on the type or brand of input and/or output device(s).

Further embodiments, variations and enhancements are described in more detail herein.

BRIEF DESCRIPTION OF THE DRAWINGS

FIG. 11 is a system diagram of an embodiment of a multifunction electronic device for use in an automobile or other vehicle, with an integrated adapter unit for selectively modifying audio or vide data.

DETAILED DESCRIPTION OF PREFERRED EMBODIMENTS

Figure 1:
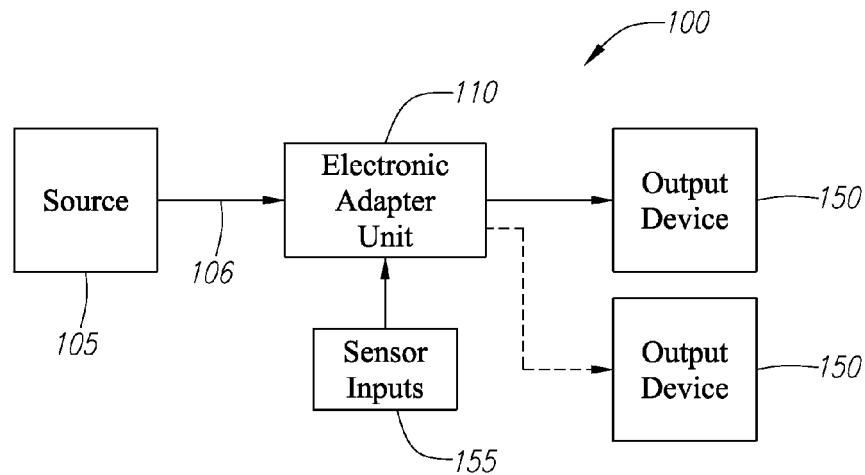
FIG. 1 is a block diagram of an embodiment of system in which an electronic adapter unit is deployed for selectively modifying audio or video data from a source for use with an output device.

FIG. 1 is a block diagram of one embodiment of system 100 in which an electronic adapter unit 110 is deployed for selectively modifying an audio or video data signal 106 from an input source device 105 for use with an output device 150. In FIG. 1, the input source device 105 may be any electronic audio or video source device, and the audio or video data signal 106 may be analog or digital in nature. By way of example and not limitation, the input source device 105 may be a compact disc player, stereo, DVD player, computer, television receiver, cable set-top box, laptop, MP3 player, cassette player, radio, cellular telephone, personal digital assistance (PDA) or smartphone, and so on. The input source device 105 may read audio or video data from a recorded medium, such as a compact disc, DVD, CD-ROM, ROM (including any type of PROM, EPROM, EEPROM, etc.), flash memory, tape, or cassette, or may receive a broadcast or other "real-time" signal such as a cable or satellite TV signal, AM/FM or satellite radio signal, Internet radio, streaming audio or video, or a live feed such as from a microphone, camera, musical instrument, and the like. The output device 150 may generally be any type of audio or video output device such as, again by way of example and not limitation, speakers or audio drive units, earphones, a stereo system component, a computer monitor or display, an analog television screen, an LCD screen, a plasma screen, and so on. The electronic adapter unit 110 is preferably compatible with a variety of different input source devices 105, and may, in certain embodiments, be provided with multiple outputs to serve more than one output device 150.

In a preferred embodiment, the electronic adapter unit 110 is provided with one or more sensors 115 which sense at least one characteristic of the input source device 105, the audio or video data signal 106, the output device 150, or the environment, and modifies the audio or video data signal 106 using a stored modification profile that is selected for the given input source device 105, audio or video data signal 106, output device 150, or environmental condition.

By way of example, for an audio data signal 106, the electronic adapter unit 110 may sense a specific type or brand of input source device 105, based on, e.g., the nature or format of the data, embedded metadata, or other indicia, or via a manual input of the electronic adapter unit 110, and may select a particular stored profile that is best suited for that type or brand of input source device 105. Similarly, the electronic adapter unit 110 may sense a specific type or brand of output device 150, based on, e.g., a handshake signal exchanged with the output device 150, measured electronic characteristics of the output device, or other indicia, or via a manual input of the electronic adapter unit 110, and may select a particular stored profile that is best suited for that type or brand of output device 150.

The electronic adapter unit 110 may also be provided with one or more sensors 155 such as, e.g., a microphone that detects ambient or background noise, and may select a particular stored profile that is best suited for the ambient noise conditions. For example, where the ambient noise pattern resembles that of an airplane, the electronic adapter unit 110 may select a particular stored profile that applies compression or band limiting to the audio data signal 106. Where the electronic adapter unit 110 is portable, the sensor 155 may be an accelerometer that detects when the user is moving (e.g., jogging) and may select a particular stored profile that enhances sound of the audio data signal 106 under those conditions.

The sensor 155 may also take the form of a user selection mechanism (such as key(s), rotating knob or wheel, etc.), in which case the electronic adapter unit 110 may select a stored profile in response to the user selection. The stored profiles may be selected for particular types of input or output audio devices, or combinations of particular input and output devices.

For a video data signal 106, the electronic adapter unit 110 may sense a specific type or brand of input source device 105, based on, e.g., the nature or format of the data, embedded metadata, or other indicia, or via a manual input of the electronic adapter unit 110, and may select a particular stored profile that is best suited for that type or brand of input source device 105. Similarly, the electronic adapter unit 110 may sense a specific type or brand of output device 150, based on, e.g., a handshake signal exchanged with the output device 150, measured electronic characteristics of the output device, or other indicia, or via a manual input of the electronic adapter unit 110, and may select a particular stored profile that is best suited for that type or brand of output device 150.

The electronic adapter unit 110 may also be provided with a sensor 155 such as, e.g., an optical sensor that detects ambient or background lighting conditions, and may select a particular stored profile that is best suited for the ambient lighting conditions. For example, where there, is bright light or daytime conditions, the electronic adapter unit 110 may select a particular stored profile that increases brightness or saturation of the video data signal 106 or modifies its hue, and similarly for nighttime conditions, the electronic adapter unit 110 may select a particular stored profile that decreases brightness or saturation of the video data signal 106 or modifies its hue.

As with the audio related embodiment(s), the sensor 155 may also take the form of a user selection mechanism (such as key(s), rotating knob or wheel, etc.), in which case the electronic adapter unit 110 may select a stored profile in response to the user selection. The stored profiles may be selected for particular types of input or output audio devices, or combinations of particular input and output devices.

Figure 2:
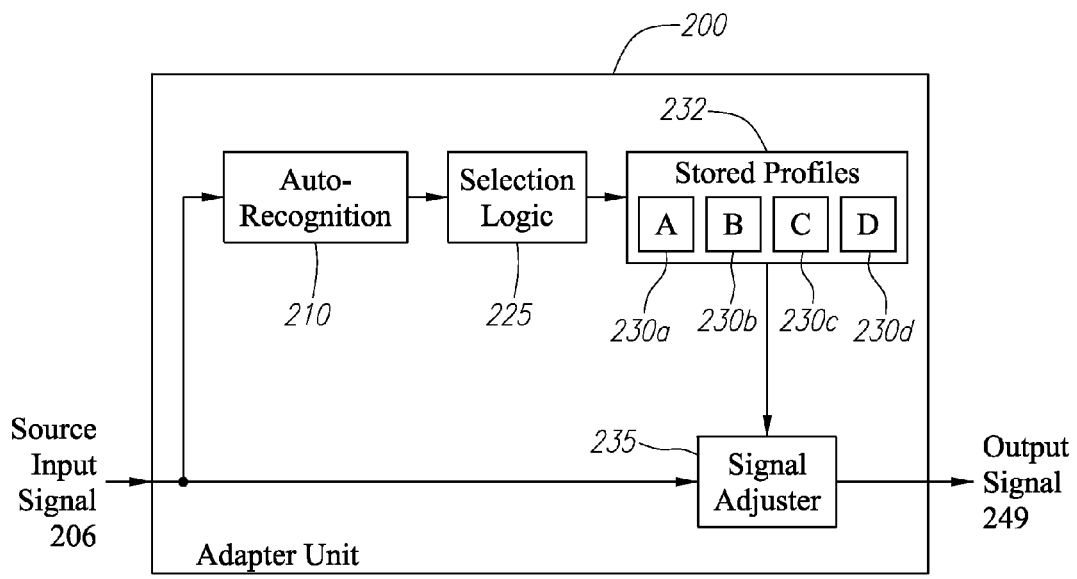
FIG. 2 is a functional block diagram of a first embodiment of an electronic adapter unit for selectively modifying audio or video data for use with an output device.

FIG. 2 is a functional block diagram of a first embodiment of an electronic adapter unit 200 for selectively modifying audio or video data for use with an output device. As shown in FIG. 2, the electronic adapter unit 200 receives a source input signal 206 from an input device (not shown in FIG. 2) and provides an output signal 249 to an output device (also not shown in FIG. 2). In this embodiment, an auto-recognition unit 210 receives the incoming source input signal 206 and, based thereon, automatically determines the type or brand of input device.

For an audio source input signal 206, the auto-recognition unit 210 may, for example, sense a specific type or brand of input source device, based on, e.g., embedded metadata, which may indicate the specific type or brand of input source device, or indicate that the audio source material has been compressed or streamed, or is analog in nature, and so on. The auto-recognition unit 210 may also analyze the frequency content or format of the source input signal to determine the most appropriate type of modification for the audio content. For example, for audio source material that has been compressed or streamed, the adapter unit 200 may select a stored profile that generally boosts bass tones.

For a video source input signal 206, the auto-recognition unit 210 may sense a specific type or brand of input source device, based on, e.g., embedded metadata, which may indicate the specific type or brand of input source device 105, or indicate that the video source material has been compressed or streamed, or is analog in nature, and so on. The auto-recognition unit 210 may also analyze the frequency content or format of the source input signal to determine the most appropriate type of modification for the video content.

The auto-recognition unit 210 provides an indication of the input device or source input signal 206 to selection logic 225, which in turn selects one of a plurality of stored modification profiles 230a . . . 230d from a durable storage medium 232, for application to the source input signal 206. The durable storage medium 232 may comprise, e.g., any type of ROM (including PROM, EPROM, or EEPROM), flash memory, a hard drive, or other durable storage, depending on the size, power and other constraints of the electronic adapter unit 200. While four stored modification profiles 230a . . . 230d are represented for purposes of illustration in FIG. 2, the durable storage medium 232 may store any number of modification profiles up to the available storage limit. The stored modification profiles 230a . . . 230d may be manufactured into the electronic adapter unit 210, may be loaded into the electronic adapter unit 210 as a pre-programmed semiconductor chip (such as a flash memory), which may be removable and/or replaceable, and/or may be modified by a remote wired or wireless communication link. As one possible example, the input device may be a smartphone or wireless PDA, in which case the electronic adapter unit 200 may take advantage of the wireless capability of the input device to receive and download a new modification profile for storage in the durable storage medium 232. The modification profile may be, e.g., selected by the user via a link or a selection at a webpage that offers modification profiles for different settings, situations, or types of input devices.

The selection logic 225 may be simple digital logic circuitry, or else may take the form of an embedded electronic controller or processor. The selected modification profile from the stored modification profiles 230a . . . 230d is applied to the source input signal 206 by a signal adjuster 235. The signal adjuster 235 could be embodied in a variety of manners; for instance, it could be embodied as an audio or video mixer, or as tap selections for a digital filter, or as gain factors or weightings for a set of bandpass filters, and so on. The signal adjuster 235 may include one or more polynomial filter section(s) and, more specifically, may comprise a series of second order polynomial filter sections. The signal adjuster 235 may thereby adjust the source input signal 206 in a non-uniform or relatively complex manner.

The signal adjuster 235 may, in one example, modify the spectral balance/content of the source input signal 206 dependent upon the characteristics of the selected modification profile, resulting in the modified output signal 249. Alternatively, the modification profile may alter the spectral balance/content of the source input signal 206 in response to some aspect of the input signal 206 or output signal 249, such as its amplitude. In this case, the modification profile may correlate to control settings such as, e.g., gain factor(s), filter coefficients, or the like.

The signal adjuster 235 may also modify the time response characteristics of the source input signal 206 in response to the selected modification profile, resulting in the modified output signal 249. For example, the modification profile may alter the envelope of the amplitude of the source input signal 206 as a function of time and amplitude, for instance temporarily boosting the amplitude of the output signal when there is a variation in the amplitude of the signal envelope. In this situation, the modification profile could potentially correlate to control settings such as, e.g., gain factor(s), filter coefficients, or the like. The specific modifications that are applied by the signal adjuster 235 may be determined by a combination of the selected modification profile and the envelope of the source input signal 235.

The signal adjuster 235 may also modify the instantaneous relationship between the voltage of the source input signal 206 and the voltage of the output signal 249 in response to the selected modification profile, resulting in the modified output signal 249. For example, the modification profile may represent a non-linear function or relationship that may be used to, e.g., selectively boost the contrast in a video signal, or for other purposes.

For different source input signals 206 or different input devices, a different modification profile from among the stored modification profiles 230a . . . 230d may be selected. In this manner, the audio or video output signal 249 may be optimized, enhanced or tuned to suit the listener or viewer, as the case may be.

Figure 3:
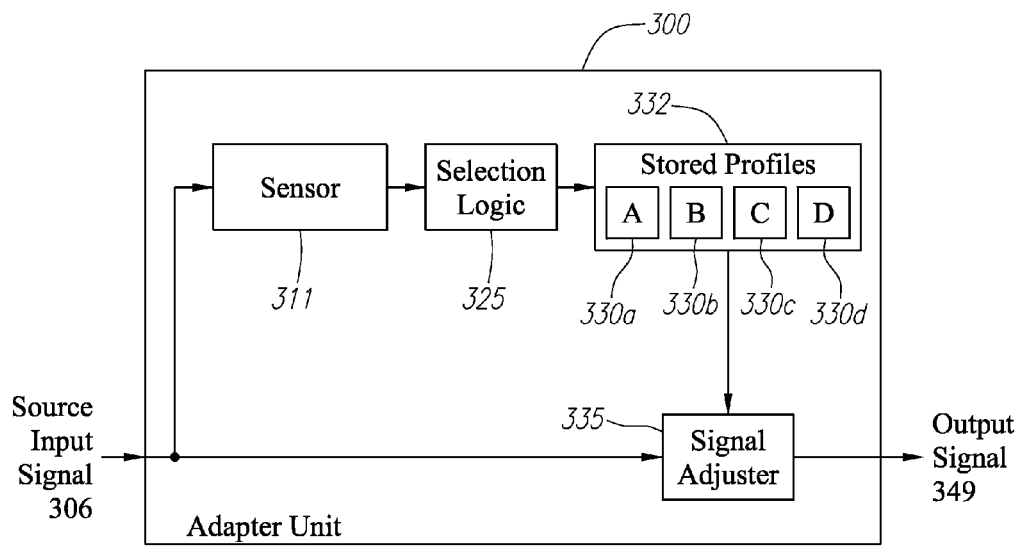
FIG. 3 is a functional block diagram of a second embodiment of an electronic adapter unit for selectively modifying audio or video data for use with an output device.

FIG. 3 is a functional block diagram of a second embodiment of an electronic adapter unit 300 for selectively modifying audio or video data for use with an output device. The embodiment of FIG. 3 is generally similar to that of FIG. 2, but instead of having an auto-recognition unit 210, the electronic adapter unit 300 in this case has a sensor 311 for detecting an aspect or characteristic of the environment. The selection logic 325 here selects a stored modification profile from among the plurality of stored modification profiles 310a . . . 310d based upon the input from the sensor 311.

For example, for an audio device, as previously explained, the sensor 311 may comprise a microphone that detects background or ambient noise, or an accelerometer that detects user motion or activity. For a video device, the sensor 311 may comprise, e.g., an optical detector that detects the ambient light conditions.

As noted previously, the sensor 311 may also take the form of a user selection mechanism (such as key(s), rotating knob or wheel, etc.), in which case the electronic adapter unit 300 may select a stored modification profile 310a . . . 310d in response to the user selection. The stored modification profiles 310a . . . 310d may be selected for particular types of input or output audio devices, or combinations of particular input and output devices.

Figure 4:
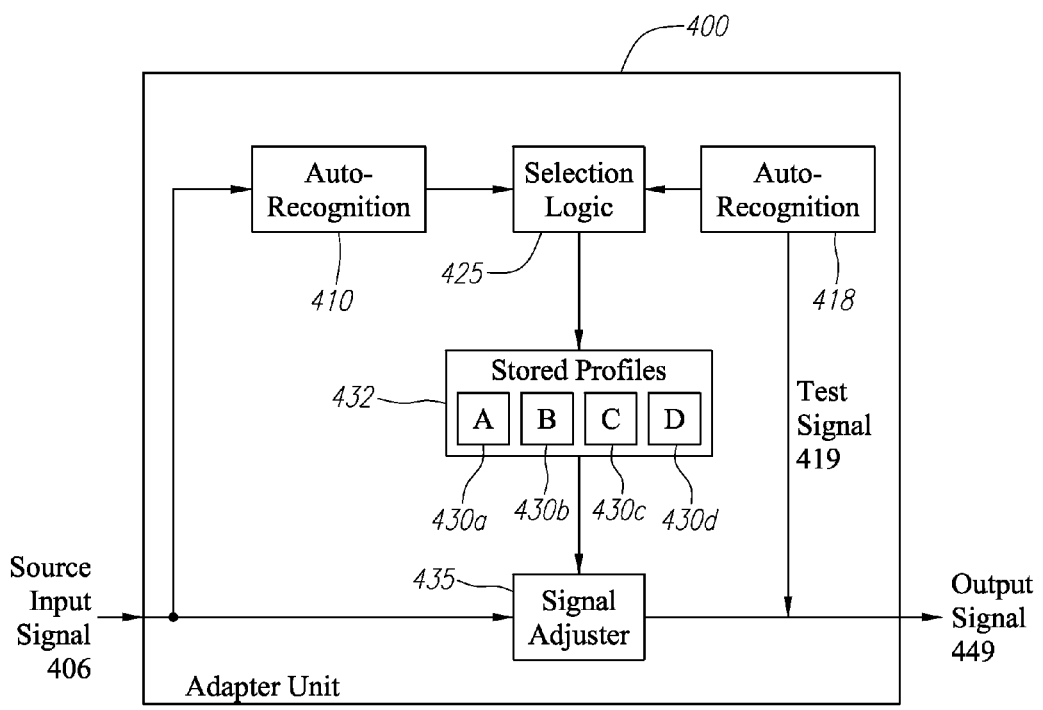
FIG. 4 is a functional block diagram of a third embodiment of an electronic adapter unit for selectively modifying audio or video data for use with an output device.

FIG. 4 is a functional block diagram of a third embodiment of an electronic adapter unit 400 for selectively modifying audio or video data for use with an output device. The embodiment of FIG. 4 is similar to that of FIG. 2, but it additionally includes a second auto-recognition unit 418 for automatically detecting the type or brand of output device (not shown in FIG. 4). The second auto-recognition unit 418 may recognize the type or brand of output device by, e.g., conducting a brief handshake with the output device when the output device is first connected to the electronic adapter unit 400. Alternatively, the second auto-recognition unit 418 may recognize the type or brand of output device by measuring electronic characteristics of the output device through a test signal 419.

The selection logic 425 may select the stored modification profile based on either the type or brand of input or output device, or the combination thereof. For example, the selection logic 425 upon recognizing a particular brand of input device and particular brand of output device, may select a modification profile that enhances the sound for that particular combination of devices. In an audio setting, for example, different earphones may have significantly different electronic characteristics and different shapes and audio characteristics, which in turn significantly affects how the listener perceives and experiences the audio sound reproduction. The selection logic 425 may select a certain modification profile for one type of earphone headset, but a different modification profile for a different type of earphone headset with different characteristics.

As an example of usage, a listener may use the same earphones with a variety of different audio sources, such as an MP3 player and a cellular telephone. The electronic adapter unit may provide a first modification profile for the MP3 player for use with the headphones, but a different modification profile for the cellular telephone with the same headphones. In the case of the cellular telephone, the modification profile may be engineered to enhance voice quality, while for the MP3 player the modification profile may be tuned to enhance musical quality. In this way, the listener may obtain a preferred sound for both the MP3 player and the cellular telephone.

As a further example, a user may purchase a new input device (such as an MP3 player) that has substantially different electrical characteristics than the user's prior input device, or may purchase a new output device (such as earphones) that have substantially different sound properties or profile than the user's prior output device. The user may use the electronic adapter unit to tune the audio according to the user's preferences, to make the audio more consistent with or similar to the user's listening preferences. For example, if the user prefers a heavier bass sound, the user may select a modification profile that enhances the bass tones. The modification profiles can also be used to allow relatively inexpensive output devices (e.g., earphones) to emulate the sound profile of more expensive products.

Figure 6:
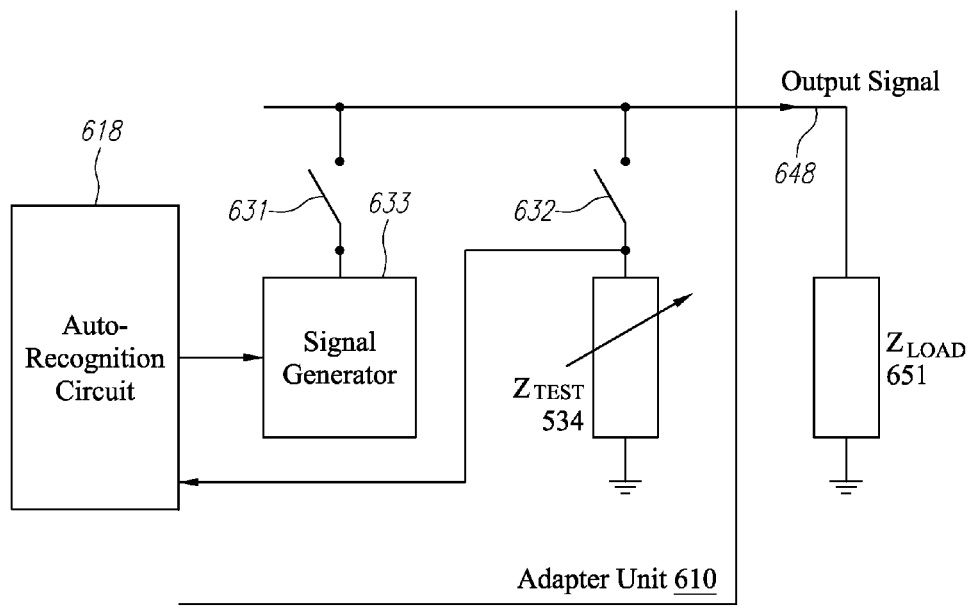
FIG. 6 is a schematic block diagram of an auto-detection circuit for detecting a type of audio output device, according to one embodiment.

FIG. 6 is a schematic block diagram of an auto-detection circuit 618 for detecting a type of audio output device, according to one embodiment, as may be used for example in the embodiment of FIG. 4. In the embodiment of FIG. 6, when the output device is first connected to the electronic adapter unit 610, the auto-recognition circuit 618 is enabled to attempt to detect or recognize the output device. In this example, the auto-recognition circuit 618, by way of switches 631 and 632, connects a signal generator 633 to the output signal line 648, and simultaneously connects a test impedance 634. The auto-recognition circuit 618 may inject a known current onto the output signal line 648 and detect the impedance of the output device by measuring impedance of the known test impedance in parallel with the output device (load), represented as ZLOAD 651 in FIG. 6.

In more elaborate embodiments, the signal generator 633 may generate AC waveforms and measure variations in the load impedance 651 in order to obtain a profile of the output device. The AC waveforms may be generated at several or many different frequencies in order to generate the output device profile. The generated profile may be compared with stored profiles in order to recognize or identify the type of output device, or else the general characteristics of the generated profile may be used to select an optimal modification profile.

Alternatively, the auto-detection circuit 618 may not require a signal generator 633 or test impedance 634 or related switches 631, 632, and instead make a direct measurement of the voltage and current of the output signal 649. The auto-detection circuit 618 may then take a fast Fourier transform (FFT) of each of these signals, and then divide the FFT of the voltage by the FFT of the current to determine the impedance of the load without needing to generate specific test signals. Digital circuitry is conventionally available, or may be straightforwardly adapted, for rapidly calculating FFTs of a signal.

Figure 5:
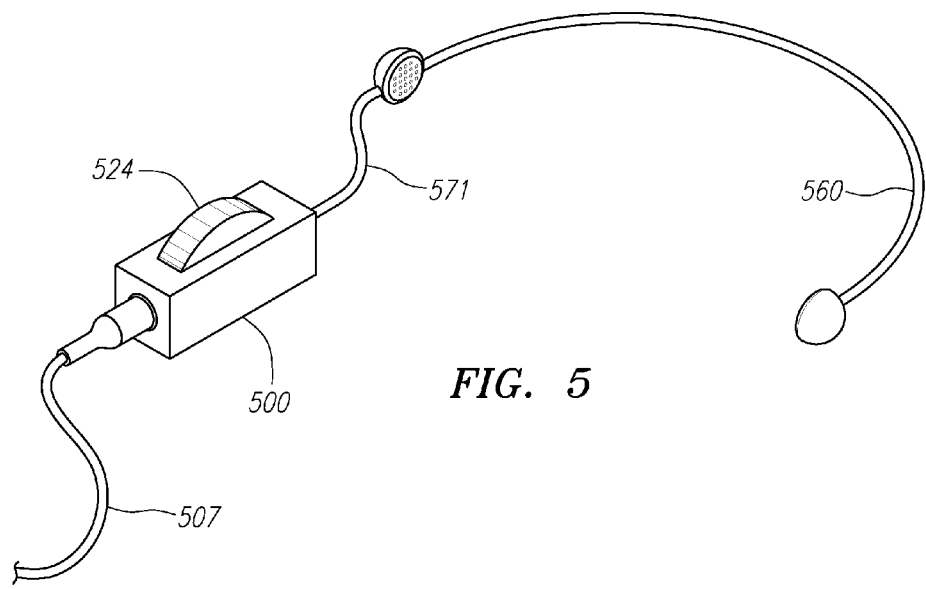
FIG. 5 is a diagram of an embodiment of a portable electronic adapter unit for selectively modifying audio data for providing an audio signal to a set of earphones.

FIG. 5 is a diagram of a particular embodiment of a portable electronic adapter unit 500 for selectively modifying audio data for providing an audio signal to a set of earphones 560. As shown in FIG. 5, a portable electronic adapter unit 500 may be embodied as a relatively compact, self-contained unit with input and output connectors for receiving a source input and providing a modified signal to an output device. The portable electronic adapter unit 500 in this example has standard jacks for receiving an input cable 507 from an input device (not shown in FIG. 5) such as, e.g., an MP3 player, cellular telephone, etc., and connecting to the earphones 560 via an output cable 571. The portable electronic adapter unit 500 may take the form of any of the embodiments illustrated in FIG. 2, 3 or 4. In this case, the portable electronic adapter unit 500 has a compact housing (which may be made of molded plastic or other moisture-resistant material) and a rotating wheel 524 allowing the user to manually select or override the stored modification profile for application by the portable electronic adapter unit 500.

Although not shown in FIG. 5, the portable electronic adapter unit 500 may have a second output jack, allowing two people with separate earphone sets to share the benefits of the automatic sound modification to a single audio source input.

Figure 9:
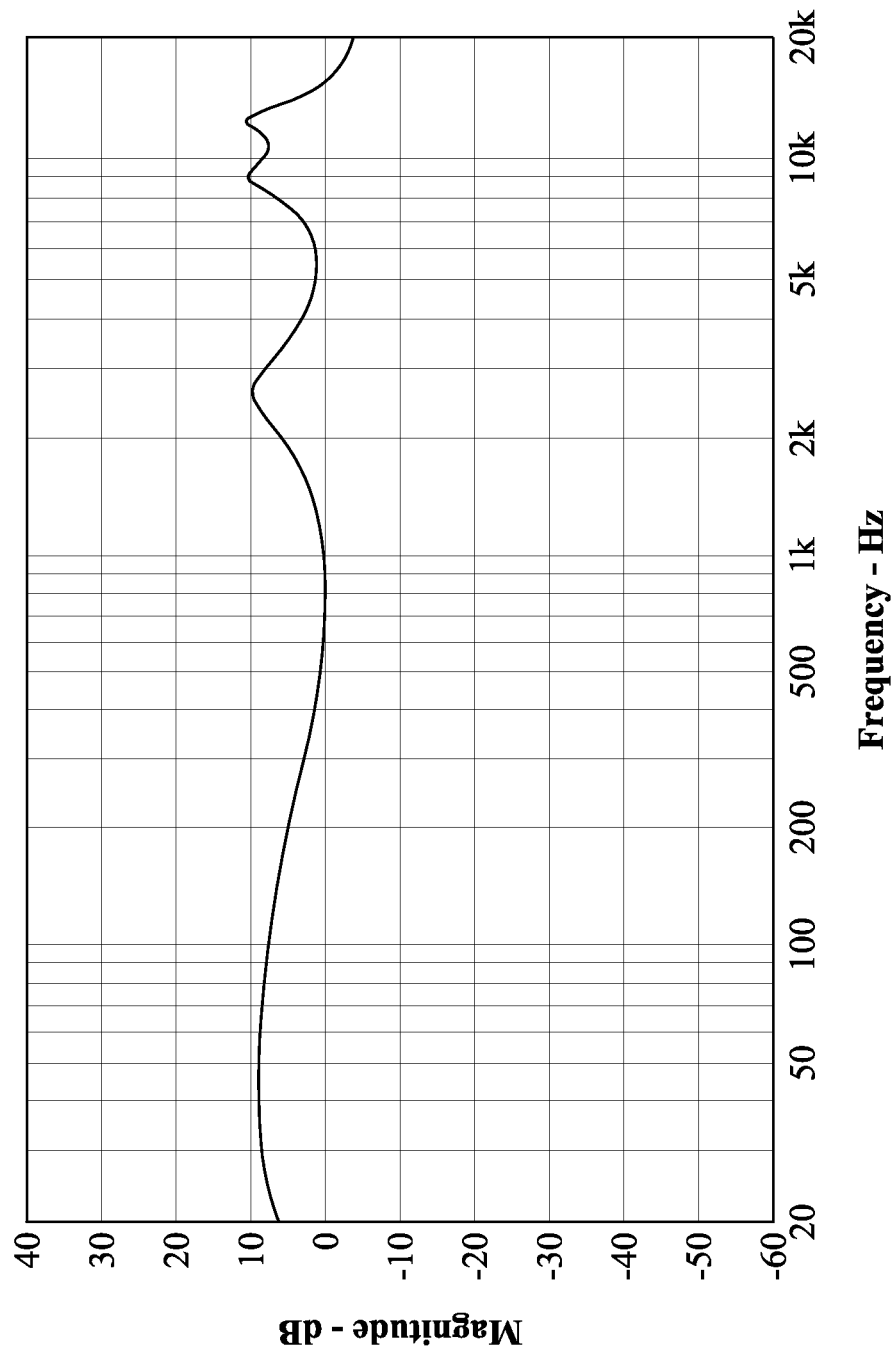
FIG. 9 is a graph of a sample modification profile that may be applied in an electronic adapter unit for an audio device.

FIG. 9 is a graph of a sample modification profile that may be applied in an electronic adapter unit for an audio device. As shown in FIG. 9, the modification profile may take on a complex shape tailored for specific devices or situations. In the example of FIG. 9, the modification profile results in a selective boost of bass tones below 200 Hz, and also provides selective boost at approximately 2600 Hz and a double-peak boost characteristic at approximately 9 kHz and 12 kHz. With the techniques described herein, a wide variety of modification profiles are possible.

The modification profiles may be generated in any of a variety of ways. A modification profile may, for example, be generated to match different input devices to a template or idealized profile, so that the characteristics of the output device will remain consistent across different input devices by use of the electronic adapter unit.

Similarly, the same input device may be tested with different models of output device, and the response recorded for each case. A modification profile may be generated to match the different output devices with a template or idealized profile, so that the electronic adapter unit can make different output devices behave in a similar way, or have one type of output device emulate a different type of output device.

As another example, different frequency response profiles may be generated for different types of music (e.g., rock, pop, classical, hip-hop, country, etc.), and a modification profile may be created for each type of music to enhance its quality. The auto-recognition circuitry or logic may analyze the source input signal to determine its frequency response characteristics and, based on the closest match to the previously obtained frequency response profiles for different types of music, automatically select a modification profile that corresponds to the closest match.

As yet another example, test frequency and/or time response profiles may be generated for different audio sources, such as compressed sources and uncompressed sources (for compressed sources, sources having different levels of compression may also be measured and characterized with a test profile). A modification profile may be generated to enhance each type of audio source with respect to particular output devices. The auto-recognition circuitry or logic may analyze the source input signal to determine its frequency and/or time response characteristics and, based on the closest match to the previously obtained frequency and/or time response profiles, automatically select a modification profile that corresponds to either compressed or uncompressed audio content (and in the case of compressed audio content, the profile that matches the appropriate degree of compression).

In any of the above cases, the audio (or video) content may also include embedded meta-data to facilitate identification of the input device or type of data (e.g., compressed or uncompressed, type of music, etc.). In such a situation the design of the auto-recognition unit may be simplified.

Figure 7:
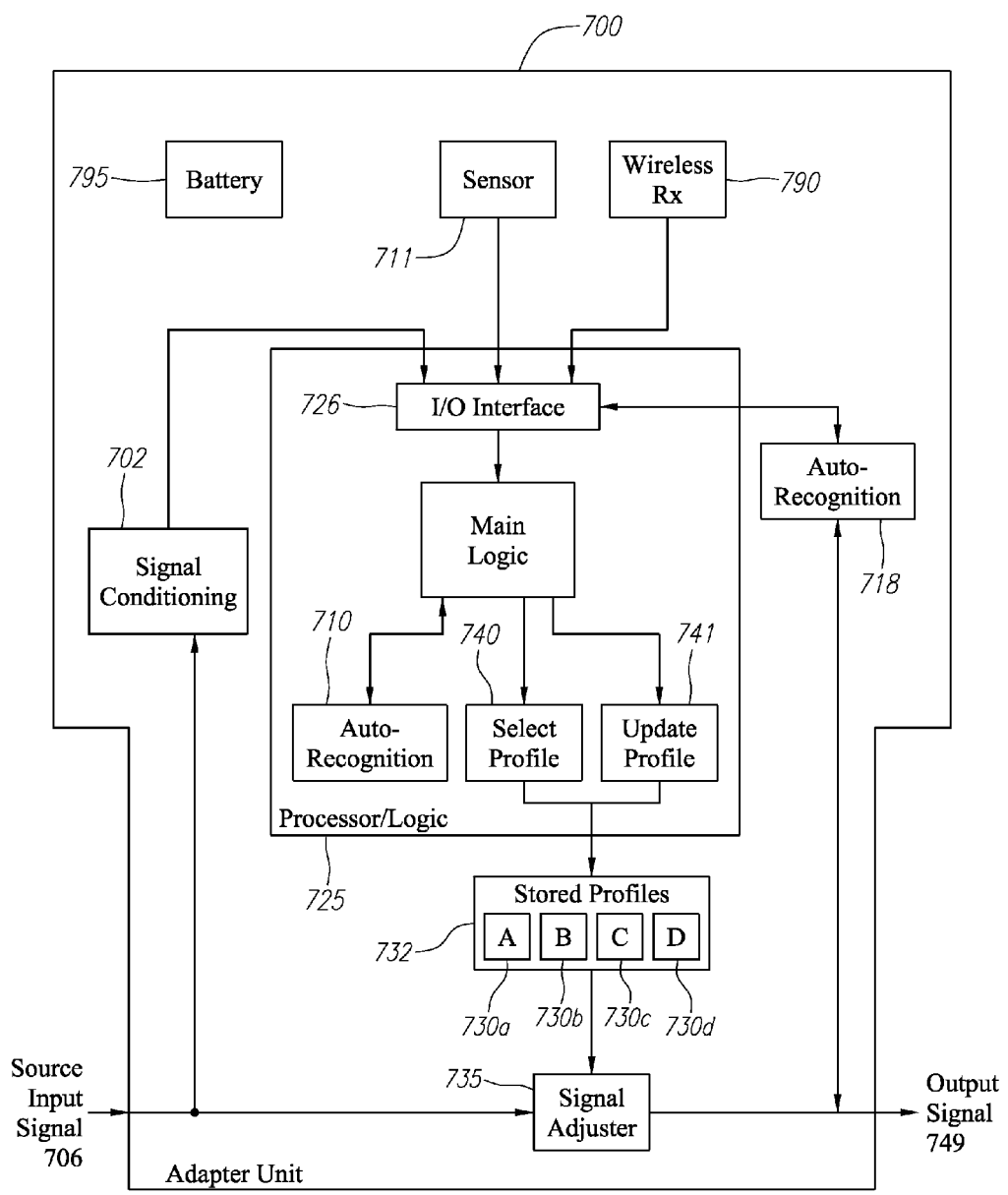
FIG. 7 is a more detailed block diagram of an embodiment of an electronic adapter unit for selectively modifying audio or video data for use with an output device.

FIG. 7 is a more detailed block diagram of an embodiment of an electronic adapter unit 700 for selectively modifying audio or video data for use with an output device, although not all of the components or features are needed in all cases. In the embodiment of FIG. 7, a digital controller 725 (which may be embodied as a processor, state machine, FPGA, or other circuitry) provides or controls the bulk of the functionality of the electronic adapter unit 700. A source input signal 706 is coupled to an optional signal conditioning circuit 702, which provides the (conditioned) input signal to an I/O interface 726 of the digital controller 725. The digital controller 725 in this embodiment includes auto-recognition functionality that corresponds to the auto-recognition unit 210 of FIG. 2. The digital controller 725 also receives, via the I/O interface 726, an input from a sensor 711 which may generally correspond to sensor 311 described in connection with FIG. 3. In this example, the electronic adapter unit 700 also includes a second auto-recognition circuit 718 that generally corresponds to the similar component in FIG. 4.

Based on the various inputs from the auto-recognition unit 710, sensor 711, and second auto-recognition unit 718 (although not all of these inputs need to be present, or else some may be ignored, or they may be prioritized), the digital controller 725, according to pre-programmed logic, sends a select profile signal 740 to a durable storage medium 732 storing a plurality of stored modification profiles 730a . . . 730d. The selected modification profile is applied to the source input signal 706 via mixer 735, as previously described.

The electronic adapter unit 700 may also have a wireless receiver 790 for receiving and downloading new modification profiles, for storage in the durable storage medium 732.

Where the adapter unit 700 is portable, it may have a battery 795 for providing power to the various electronic components thereof.

Figure 8A:
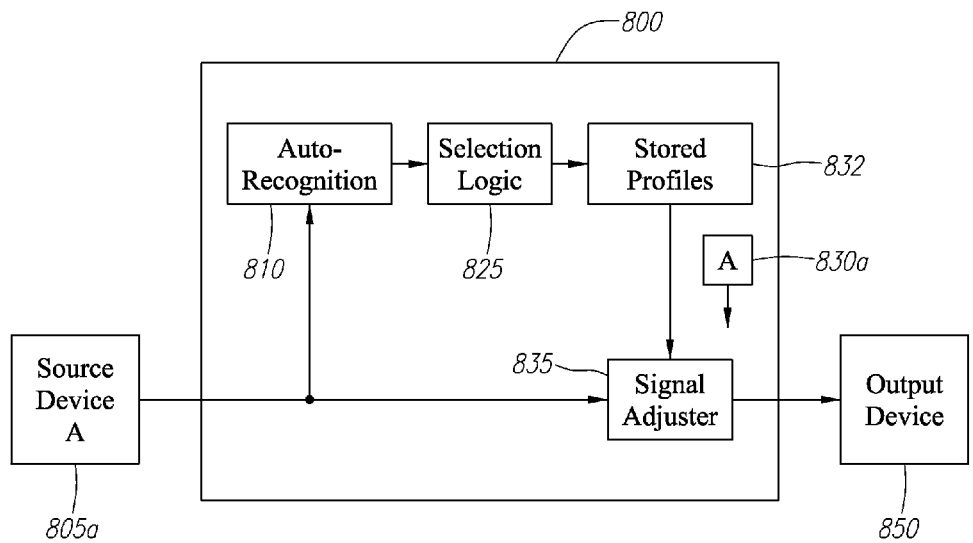
FIGS. 8A and 8B are block diagrams illustrating an example of operation of an electronic adapter unit for selectively modifying audio or video data for use with an output device, in accordance with the embodiment of FIG. 2.
Figure 8B:
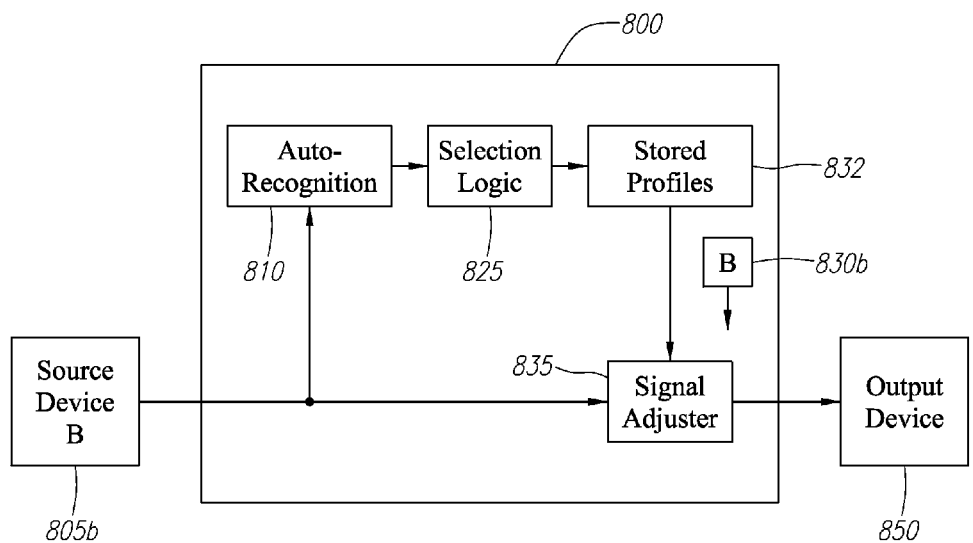

FIGS. 8A and 8B are block diagrams illustrating an example of operation of an electronic adapter unit 800 for selectively modifying audio or video data for use with an output device, using in this example the embodiment shown in FIG. 2. As shown in FIG. 8A, for a first type of input device 805a, a first stored modification profile "A" is applied to the source input signal. For a second type of input device 805b, as shown in FIG. 8B, a second stored modification profile "B" is applied to the source input signal.

In certain embodiments, the adapter unit is integrated with other electronics or devices, and in some cases may be integrated with the input source device and/or the output device. For example, the adapter unit may be integrated with a handheld MP3 player, PDA or smartphone. In such cases, the input selection mechanism (e.g., keys or touchpad) of the integrated device may be used to permit the user to select a particular stored modification profile, where such capability is provided.

In other embodiments, including those where the electronic adapter unit automatically selects a profile, the user may be permitted to manually select or override the stored profile to select a different profile, or no profile (i.e., no modification), based on the user's preferences.

The electronic adapter unit may include a learning algorithm as part of the selection logic, whereby the selection logic may alter a particular profile or change its selection scheme in response to changes that a user makes to an automatically selected profile. For example, after a particular modification profile is automatically selected, the user may adjust it via manual controls. The selection logic may store the user changes for future use. Similarly, the user may override the automatically selected modification profile with a different modification profile. The selection logic may note this fact and, in future situations that are similar, automatically apply the user's selected modification profile instead of the one that it had previously selected automatically.

Figure 10:
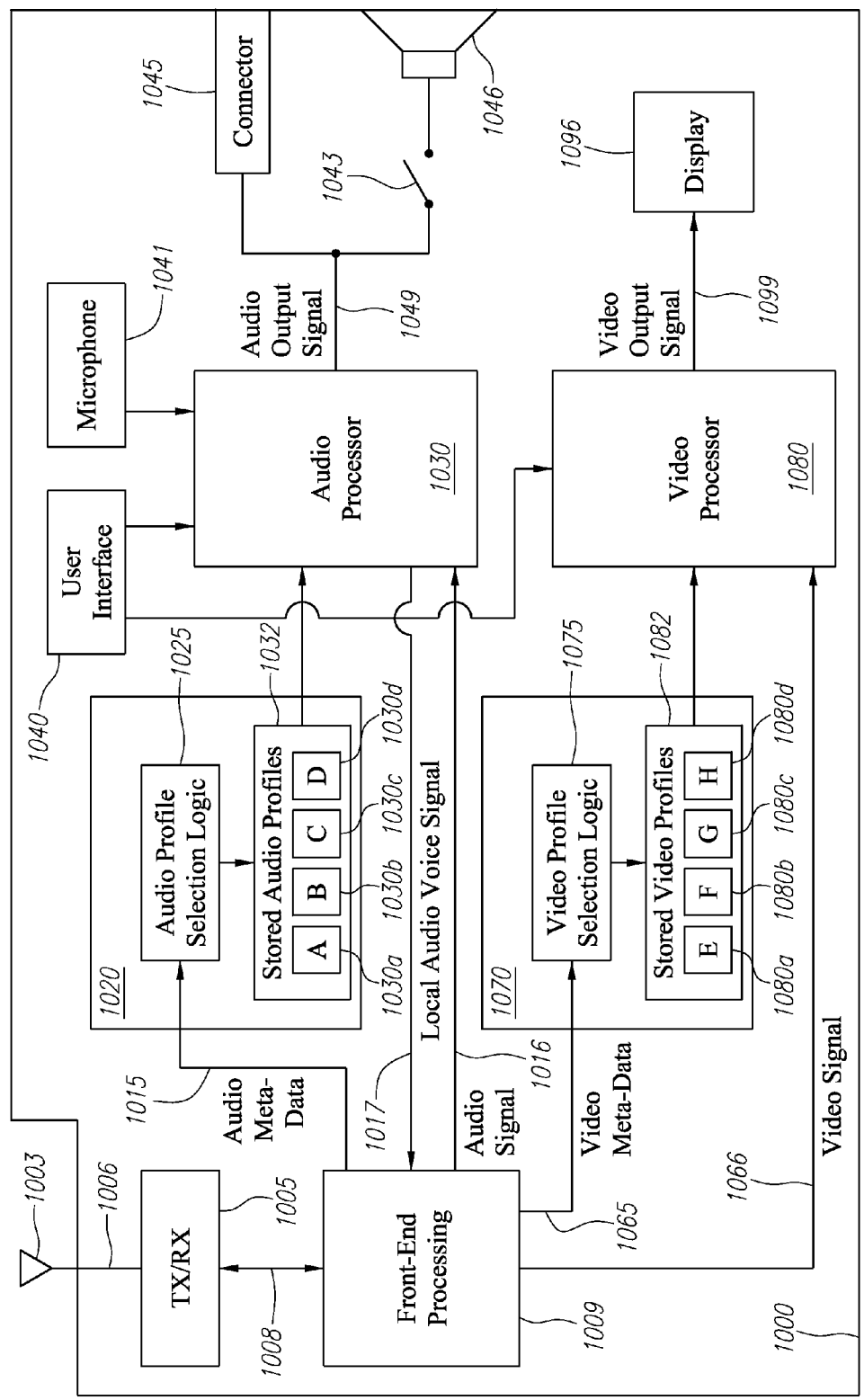
FIG. 10 is a system diagram of an embodiment of a mobile device with an integrated adapter unit for selectively modifying audio or video data.

FIG. 10 is a system block diagram of an embodiment of a mobile device 1000 with an integrated adapter unit for selectively modifying audio or video data. The mobile device 1000 may be, for example, a smartphone or other device having an audio output and/or graphic display. In the embodiment of FIG. 10, a transceiver 1005 receives wireless signals via an antenna 1003 and preferably conveys the received signals 1008 to a front-end processing unit 1009. The received signals 1008 may comprise, for instance, compressed digital audio or video signals for playback on or through the mobile device 1000. The received signals 1008 may also, at times, constitute digital voice data when a user is engaged in a mobile telephone call, or digital video data when the user is engaged in a video call. The front-end processing unit 1009 may organize packets of data and separate out meta-data that contains information identifying or describing the audio or video content type. For an audio signal, the meta-data 1015 is provided to an audio adapter unit 1020 in the mobile device. For a video signal, the meta-data 1065 is provided to a video adapter unit 1070 in the mobile device.

The audio adapter unit 1020 and video adapter unit 1070 operate in a similar fashion to the electronic adapter unit(s) described previously herein, and selectively modifying the audio or video data, respectively, to alter the audio or video output signal. For an audio signal, an audio profile selection logic block 1025 of the audio adapter unit 1020 receives and interprets the audio meta-data 1015, and selects a stored audio profile from a durable storage medium 1032 (e.g., EEPROM or flash memory) storing a plurality of stored audio modification profiles 1030*a* . . . 1030*d*. The selected modification profile is provided to an audio processor 1030 which also receives the audio source signal 1016. The modification profile may have characteristics which improve the sound quality of the particular type or source of audio content for the particular mobile device 1000, or enhance the specific audio work, or provide other such benefits as previously described. The audio processor 1030 applies the selected modification profile to the source input signal 1016, and provides the resulting audio output signal 1049 to a speaker 1046 (if switched on) or to earphones via an external connector 1045.

In the case of a bidirectional voice call, the audio processor 1030 may also process a voice signal received from a microphone 1041, and convey a local audio voice signal 1017 to the transceiver 1005 for transmission to a remote wireless station.

For a video signal, a video profile selection logic block 1075 of the video adapter unit 1070 receives and interprets the video meta-data 1065, and selects a stored video profile from a durable storage medium 1082 (e.g., EEPROM or flash memory) storing a plurality of stored audio modification profiles 1080*a* . . . 1080*d*. The selected modification profile is provided to a video processor 1080 which also receives the video source signal 1066 generated by the front-end processing unit 1009 from the received signal 1008. The modification profile may have characteristics which improve the image quality of the particular type or source of video content for the particular mobile device 1000, or enhance the specific video work, or provide other such benefits as previously described. As further examples, the modification profile may be chosen to improve the characteristics of streaming video, or to improve the quality or readability of the display at nighttime. The video processor 1080 applies the selected modification profile to the source input signal 1066, and provides the resulting video output signal 1099 to a display 1096 for viewing by the user.

The wireless transceiver 1005 of the mobile device 1000 may be used for receiving and downloading new modification profiles, for storage in the durable storage medium 1032 and/or 1082. A new modification profile may be downloaded concurrently with a new audio or video work for use with that work, or else the modification profiles may be stored in advance and selected based on the nature of the work being played.

Although not expressly illustrated in FIG. 10, a microcontroller, digital controller or other processor may be provided to control the general functions of the mobile device 1000, and may have access to various software applications stored locally or downloaded from a remote source. In addition, a battery or suitable power supply is understood to be present. The mobile device 1000 may include other functions such as, for instance, an integrated camera, and may also include auto-recognition functionality as previously described for detecting an earphone type or brand, for example.

While in the case of FIG. 10 the electronic adapter units are shown or described as integrated modules with locally stored profiles, in other embodiments the profiles may be stored remotely and accessed in real-time by the audio adapter unit 1020 or video adapter unit 1070. For example, the mobile device 1000 may be configured to convey information about itself to a remote broadcast control center or station, which in turn will modify the audio or video signal being transmitted to the mobile device 1000 to optimize, improve or alter its characteristics prior to transmission. In this way, a streaming audio or video transmission, for example, may be sent from a broadcast station to the mobile device 1000 that is particularly tailored to the individual properties of the mobile device 1000, improving the quality of the material upon playback. The type of information that may be conveyed to the broadcast control center or station may include, for instance, information about the type or brand of earphones, the type or brand of the display 1096, the resolution, refresh rate or other aspects of the display, the type of audio speaker 1046, the audio profile characteristics of the unit, and so on. In some cases, upon receiving general information from the mobile device 1000, such as a model number, the remote broadcast control center or station may look up the specific characteristics of the mobile device 1000 or any of its components from a local or remote database.

The modification to the audio or video source material may take place at a remote location, based on stored profiles similar to those 1030*a* . . . 1030*d* or 1080*a* . . . 1080*d* which would or could otherwise be locally stored in the mobile device 1000. Where the modification of the audio or video source material takes place at a remote location, the profiles need not be stored locally on the wireless device 1000, but in some cases it may be useful to have locally stored profiles where remote processing is unavailable or for other reasons.

The foregoing description of remote interaction is also applicable to the other embodiments described elsewhere herein.

While FIG. 10 illustrates a mobile device 1000 having both an audio processor 1030 and video processor 1080 both with adapter units, other embodiments may have, e.g., only an audio processor 1030 with an audio adapter unit 1020 (i.e., no video processing capability), or both an audio processor 1030 and video processor 1080 but only a video adapter unit 1070 without an audio adapter unit 1020. For some types of source materials, both an audio signal and a video signal will be concurrently received, such as with a compressed MPEG file, and both the audio adapter unit 1020 and video adapter unit 1070 may be employed simultaneously.

FIG. 11 is a system block diagram of an embodiment of a multi-function electronic device 1100 as may be used in an automobile or other vehicle, with an integrated adapter unit for selectively modifying audio or video data. In FIG. 11, the multi-function electronic device 1100 may be used to control and interface with various on-vehicle media and electronic systems, such as cellular phone service, navigation, and entertainment (including radio, CD, MP3, DVD, and other audio or multi-media sources). The multi-function electronic device 1100 may be located in a vehicle center console, dashboard area, or other location on the vehicle. It may be integrated with the dashboard and/or console controls, or may communicate therewith.

In the embodiment of FIG. 11, a wireless interface 1105 receives wireless signals via an antenna 1103 and preferably conveys the received signals to various other sub-systems or modules within the multi-function electronic device 1100. While only a single antenna 1103 is shown, the multi-function electronic device 1100 may be coupled to different types of antennas including a cellular telephone antenna, a broadcast radio antenna, and/or a GPS antenna. Similarly, the wireless interface 1105 may have different sub-units each adapted to process a particular type of data, such as cellular telephone data, analog or digital broadcast radio data, and/or GPS data. The multi-function electronic device 1100 may also receive inputs from an on-vehicle DVD player 1161 or a CD player 1162, and may optionally store files locally, such as audio files (in, e.g., MP3 format) 1172 or audio-visual files (in, e.g., MPEG format) 1171.

The multi-function electronic device 1100 may further include an audio sub-system 1128 for generally handling the various audio functions of the device, and well as a video sub-system 1168 for generally handling the various video functions of the device. The audio sub-system 1128 may interface with a microphone 1141 and speaker 1146, and include an audio processor 1130 and audio adapter unit 1125. The video sub-system 1168 may interface with a display 1196, which is preferably visible to the driver, and may include a video processor 1180 and video adapter unit 1175. The audio sub-system 1128 and video sub-system 1168 may generally be responsive to a controller 1144 which, among other things, controls the input source for the sub-systems, which is in turn responsive to various user inputs as may be entered via a user interface 1140 (either part of the multi-function electronic device 1100 or in communication therewith).

The multi-function electronic device 1100 may further include a navigation module 1113 which receives and processes GPS signal received via the wireless interface 1105. The navigation module 1113 may be of a conventional variety, and provides video images to the video sub-system 1168 for rendering on the display 1196. In some cases, such as with voice-assisted navigation, the navigation module 1113 may also provide an audio signal to the audio su-system 1128. Besides the video images received from the navigation module 1113, the video sub-system 1168 may also receive video signals from the DVD input 1161 or from local media files 1171. In some cases, the video sub-system 1168 may also have local image files 1192 available for display, particularly where the device is integrated with other vehicle functions such as climate control, vehicle status information, and so on. The video adapter unit 1175 may be employed only for certain types of content, such as streaming video received over the wireless interface 1105, or may be employed for all different types of available content. The video adapter unit 1175 may, based on the particular source of the video content (e.g., wireless streaming, DVD, local media, navigation) or its characteristics (compression, etc.), and/or the particulars of the display or the nature of the specific video work as indicated by accompanying meta-data, select an appropriate profile from among a number of durably stored profiles (not shown) to optimize, improve, enhance or otherwise alter the video material being shown on the display 1196.

In the case of streaming video received over the wireless interface 1105, the video adapter unit 1175 may send information about the specifics of the multi-function electronic device 1100 or its key components (such as the type, brand or characteristics of the display 1196), which in turn may allow the remote broadcast center or station to alter or adjust the streaming video to be more suitable for the local environment, e.g., to improve the picture quality for the display 1196.

The audio sub-system 1128 operates in a similar fashion to the video sub-system 1168. The audio sub-system 1128 may include a phone module 1131 for handling cellular telephone calls, which are transmitted and received via the wireless interface 1105. The audio sub-system 1128 also may receive streaming audio via the wireless interface 1105, or audio input from any of the DVD input 1161, local multi-media files 1171, local audio files 1172 (such as MP3 files), or a CD input 1162. The audio adapter unit 1125 may, based on the particular source of the audio content (e.g., cellular telephone, wireless streaming, DVD, CD, MPEG, MP3, navigation) or its characteristics (compression rate, voice vs. music, type of music, etc.), and/or the particulars of the speaker 1146 or the nature of the specific audio work as indicated by accompanying meta-data, select an appropriate profile from among a number of durably stored profiles (not shown) to optimize, improve, enhance or otherwise alter the audio material being reproduced via the speaker 1146 and/or conveyed to remote speakers via the stereo output signals 1142.

In the case of streaming audio received over the wireless interface 1105, the audio adapter unit 1125 may send information about the specifics of the multi-function electronic device 1100 or its key components (such as the type, brand or characteristics of the local speaker 1146 ore remote speakers), which in turn may allow the remote broadcast center or station to alter or adjust the streaming audio to be more suitable for the local environment, e.g., to improve the sound quality for the vehicle's speakers.

The audio adapter unit 1025 and video adapter unit 1075 may otherwise operate in a similar fashion to the electronic adapter unit(s) described previously herein, and selectively modify the audio or video data, respectively, to alter the audio or video output signal.

The wireless transceiver 1105 of the multi-function electronic device 1100 may be used for receiving and downloading new modification profiles, for storage in the audio adapter unit 1125 or video adapter unit 1175. A new modification profile may be downloaded concurrently with a new audio or video work for use with that work, or else the modification profiles may be stored in advance and selected based on the nature of the work being played.

While FIG. 11 illustrates a multi-function electronic device 1100 having both an audio sub-system 1128 and video sub-system 1168 both with adapter units, other embodiments may have only an audio adapter unit 1125 or only a video adapter unit 1175. For some types of works, both an audio signal and a video signal will be concurrently received, such as with a compressed MPEG file, and both the audio adapter unit 1125 and video adapter unit 1175 may be employed simultaneously.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. An electronic adapter unit, comprising:
a portable housing;
at least one signal input received or derived from an external audio or video source;
at least one signal output coupled to an external audio or video output device;
a computer readable medium within the portable housing having stored thereon a plurality of modification profiles;
a processor within the portable housing for receiving an audio or video signal from said at least one signal input, applying a selected one of said modification profiles to said audio or video signal based at least in part on a known or detected characteristic of the external audio or video output device coupled to said at least one signal output, and providing a modified audio or video signal to said at least one signal output; and
auto-recognition circuitry or logic configured to automatically detect a brand of audio or video output device by conveying a test signal from the electronic adapter unit to the audio or video output device, measuring a frequency and/or time response characteristic of the audio or video output device, and comparing the frequency and/or time response characteristic of the audio or video output device against known frequency and/or time response characteristics of different device brands.

2. The electronic adapter unit of claim 1, wherein the characteristic of the audio or video output device is a brand of audio or video output device.

3. The electronic adapter unit of claim 2, wherein the brand of audio or video output device is detected when the device is initially coupled to the signal output.

4. The electronic adapter unit of claim 3, wherein the brand of audio or video output device is detected by conveying a code or indicia signifying the brand of audio or video output device from the audio or video output device to the electronic adapter unit.

5. The electronic adapter unit of claim 2, further comprising a manual input, wherein the brand of audio or video output device is identified via the manual input.

6. The electronic adapter unit of claim 1, wherein the characteristic of the audio or video output device is a type of audio or video output device.

7. The electronic adapter unit of claim 6, wherein the type of audio or video output device is detected when the device is initially coupled to the signal output.

8. The electronic adapter unit of claim 7, wherein the type of audio or video output device is detected by conveying a code or indicia signifying the type of audio or video output device from the audio or video output device to the electronic adapter unit.

9. The electronic adapter unit of claim 6, further comprising a manual input, wherein the type of audio or video output device is identified via the manual input.

10. The electronic adapter unit of claim 1, wherein the audio or video signal comprises an audio signal, and wherein the selected modification profile alters a transfer function of the audio signal non-uniformly across a predetermined audio frequency band.

11. The electronic adapter unit of claim 10, wherein the audio or video output device comprises audio earphones.

12. The electronic adapter unit of claim 1, wherein the audio or video signal comprises an audio signal, wherein the at least one signal output is coupled to an earphone jack attached to the portable housing, and wherein the audio or video output device comprises audio earphones.

13. The electronic adapter unit of claim 1, wherein the audio or video signal comprises a video signal, and wherein the selected modification profile alters a visual characteristic of the video signal non-uniformly across a predetermined video frequency band.

14. The electronic adapter unit of claim 13, wherein the visual characteristic is a contrast level of a video image represented by the video signal.

15. The electronic adapter unit of claim 13, wherein the visual characteristic is a hue of a video image represented by the video signal.

16. The electronic adapter unit of claim 13, wherein the visual characteristic is a color tone of a video image represented by the video signal.

17. The electronic adapter unit of claim 13, wherein the visual characteristic is a saturation of a video image represented by the video signal.

18. The electronic adapter unit of claim 13, wherein the audio or video output device comprises a video display.

19. The electronic adapter unit of claim 1, wherein the audio or video signal comprises a video signal, and wherein the selected modification profile alters a plurality of visual characteristics of the video signal non-uniformly across a predetermined video frequency band.

20. The electronic adapter unit of claim 19, wherein the plurality of visual characteristics includes at least two of a contrast level, hue, tone and saturation of a video image represented by the video signal.

21. The electronic adapter unit of claim 1, wherein the modification profile is further selected based at least in part on a characteristic of an audio or video input device providing the audio or video signal.

22. The electronic adapter unit of claim 21, wherein the characteristic of the audio or video input device is a brand of audio or video input device.

23. The electronic adapter unit of claim 21, wherein the characteristic of the audio or video input device is a type of audio or video input device.

24. The electronic adapter unit of claim 21, wherein the audio or video input device is an audio input device, and the modification profile is selected at least in part on the type of audio input device, wherein the types of audio input devices include at least an MP3 player and a mobile phone device.

25. The electronic adapter unit of claim 24, wherein the types of audio input devices further includes one or more of an AM radio source, FM radio source and a digital satellite radio source.

26. The electronic adapter unit of claim 1, wherein the modification profile is downloaded from a remote source and stored in said computer readable medium for subsequent use.

27. The electronic adapter unit of claim 1, wherein:
the audio or video signal comprises both an audio signal and a video signal;
the plurality of modification profiles includes a plurality of audio modification profiles and a plurality of video modification profiles;
a selected audio modification profile alters a transfer function of the audio signal non-uniformly across a predetermined audio frequency band; and
a selected video modification profile alters a visual characteristic of the video signal non-uniformly across a predetermined video frequency band.

28. The electronic adapter unit of claim 27, wherein the processor is configured to:
apply the selected audio modification profile to said audio signal based at least in part on a known or detected characteristic of the external audio output device coupled to said at least one signal output and to provide a modified audio signal to said at least one signal output; and
to apply the selected video modification profile to said video signal based at least in part on a known or detected characteristic of the external video output device coupled to said at least one signal output and to provide a modified video signal to said at least one signal output.

29. An electronic audio or video adapter, comprising:
a portable housing;
a computer readable medium contained within said portable housing and having stored thereon modification profiles including a plurality of audio modification profiles and a plurality of video modification profiles;
an audio source signal and a video source signal;
a first signal output adapted for being electronically coupled to an external audio output device;
a second signal output adapted for being electronically coupled to an external video output device; and
a plurality of signal adjustors contained within the housing for receiving said audio and video source signals and an indication of a characteristic of the audio and video output devices, and for selecting one of said one or more audio modification profiles based at least in part on the characteristic of the audio output device and one of said one or more video modification profiles based at least in part on the characteristic of the video output device;

wherein said signal adjustors are configured to apply the selected audio modification profile to said audio source signal and provide a modified audio signal to said first signal output, and to apply the selected video modification profile to said video source signal and provide a modified video signal to said second signal output.

30. The electronic audio or video adapter of claim 29, wherein:

the selected audio modification profile alters a transfer function of the audio source signal non-uniformly across a predetermined audio frequency band; and the selected video modification profile alters a visual characteristic of the video source signal non-uniformly across a predetermined video frequency band.

31. A method for modifying an audio or video source signal for a playback device, comprising:

receiving an audio or video source signal;

detecting a characteristic of a playback device, a local environment or the audio or video source signal;

selecting a modification profile from among a plurality of predetermined modification profiles based on the detected characteristic;

applying the modification profile to the audio or video source signal to enhance the audio or video source signal, thereby generating a modified audio or video signal; and conveying the modified audio or video signal to an audio or video output component;

wherein the step of detecting a characteristic of a playback device, a local environment or the audio or video source signal comprises detecting whether the audio or video source signal is compressed or uncompressed.

32. An electronic audio or video adapter integrated within an electronic device, comprising:

an audio or video source signal;

a computer readable medium contained within a portable electronic device housing having stored thereon one or more modification profiles which when applied to the audio or video source signal emulate audio or video characteristics of a different known output device or brand of device;

a signal output adapted for being electronically coupled to an audio or video output component; and a signal adjustor contained within the portable electronic device housing for receiving said audio or video source signal, obtaining or deriving an indication of a characteristic of the audio or video output device or of the audio or video source signal, and for selecting one of said one or more modification profiles based at least in part on the characteristic of the audio or video output device or of the audio or video source signal;

wherein said signal adjustor is configured to apply the selected modification profile to said audio or video source signal and provide a modified audio or video signal to said signal output to emulate the different known output device or brand of device;

and further wherein:

the audio or video signal comprises both an audio signal and a video signal;

the plurality of modification profiles includes a plurality of audio modification profiles and a plurality of video modification profiles;

a selected audio modification profile alters a transfer function of the audio signal non-uniformly across a predetermined audio frequency band; and a selected video modification profile alters a visual characteristic of the video signal non-uniformly across a predetermined video frequency band.

33. The electronic adapter unit of claim 32, wherein said audio or video source signal comprises a video signal, and wherein said output component comprises a video display.

34. The electronic adapter unit of claim 32, wherein said audio or video source signal comprises an audio signal, and wherein said output component comprises audio earphones.

35. The electronic audio or video adapter of claim 32, wherein the signal adjustor is configured to:

apply the selected audio modification profile to said audio signal based at least in part on a known or detected characteristic of the external audio output device coupled to said at least one signal output or of the video source signal, and to provide a modified audio signal to said at least one signal output; and to apply the selected video modification profile to said video signal based at least in part on a known or detected characteristic of the external video output device coupled to said at least one signal output or of the video source signal, and to provide a modified video signal to said at least one signal output.

36. A method for modifying an audio or video source signal for a playback device, comprising:

receiving an audio or video source signal;

detecting a characteristic of a local audio noise environment or a condition of use of the audio playback device independent of the audio or video source signal;

selecting a modification profile from among a plurality of predetermined modification profiles based on the detected characteristic;

applying the modification profile to the audio or video source signal to generate a modified audio or video signal; and conveying the modified audio or video signal to an audio or video output component;

wherein the detected characteristic of a local audio noise environment or a condition of use of the audio playback device independent of the audio or video source signal is a user's motion, and wherein the selected modification profile corresponds to the user's motion.

37. The method of claim 36, wherein the audio playback device comprises an accelerometer that detects the user's motion.

* * * * *